(12) United States Patent
Park et al.

(10) Patent No.: US 10,200,826 B2
(45) Date of Patent: Feb. 5, 2019

(54) NEIGHBOR AWARE NETWORKING (NAN) DEVICE AND METHOD FOR SERVICE DISCOVERY

(71) Applicant: Intel Corporation, Santa Clara, CA (US)

(72) Inventors: Minyoung Park, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 190 days.

(21) Appl. No.: 14/727,546

(22) Filed: Jun. 1, 2015

(65) Prior Publication Data

US 2016/0226928 A1      Aug. 4, 2016

Related U.S. Application Data

(60) Provisional application No. 62/110,417, filed on Jan. 30, 2015.

(51) Int. Cl.
| | |
|---|---|
| *H04L 29/06* | (2006.01) |
| *H04W 4/06* | (2009.01) |
| *H04L 29/08* | (2006.01) |
| *H04W 76/14* | (2018.01) |
| *H04W 88/18* | (2009.01) |

(52) U.S. Cl.
CPC .............. *H04W 4/06* (2013.01); *H04L 67/16* (2013.01); *H04L 67/322* (2013.01); *H04W 76/14* (2018.02); *H04L 67/145* (2013.01); *H04W 88/182* (2013.01)

(58) Field of Classification Search
None
See application file for complete search history.

(56) References Cited

U.S. PATENT DOCUMENTS

| | | | |
|---|---|---|---|
| 2005/0044430 A1* | 2/2005 | Cheshire | G06F 1/3209 713/300 |
| 2006/0112180 A1* | 5/2006 | Vedula | H04L 67/02 709/227 |

(Continued)

OTHER PUBLICATIONS

"Neighbor Awareness Networking Technical Specification", Wi-Fi Alliance, Version 2.0, (2017), Filed in Two Parts due to size (1-94 and 95-184) 184 pgs.

*Primary Examiner* — Jeffrey M Rutkowski
*Assistant Examiner* — Andre G Tacdiran
(74) *Attorney, Agent, or Firm* — Schwegman Lundberg & Woessner, P.A.

(57) ABSTRACT

Embodiments of a Neighbor Aware Networking (NAN) device, NAN proxy device, and method for service discovery in a wireless network are generally described herein. In some embodiments, the NAN device may transmit a service discovery frame (SDF) for a subscription to a service. The SDF may indicate a registration for the service with a detected NAN proxy device. The NAN device may receive a service availability message from the NAN proxy device during one or more reception periods, which may be based at least partly on timing information included in the SDF. The subscription may enable reception of content at the NAN device from one or more other NAN devices as part of the service. The NAN device may further refrain from reception of messages during a sleep period exclusive to the reception periods.

23 Claims, 6 Drawing Sheets

(56) References Cited

U.S. PATENT DOCUMENTS

| | | | | |
|---|---|---|---|---|
| 2007/0116018 A1* | 5/2007 | Doleh | H04L 47/724 | 370/401 |
| 2008/0046777 A1* | 2/2008 | Chen | H04L 12/1868 | 714/4.1 |
| 2009/0240794 A1* | 9/2009 | Liu | H04L 29/08846 | 709/223 |
| 2013/0188515 A1* | 7/2013 | Pinheiro | H04L 67/16 | 370/254 |
| 2013/0286927 A1* | 10/2013 | Jiao | H04W 76/002 | 370/312 |
| 2014/0112222 A1* | 4/2014 | Park | H04W 4/08 | 370/311 |
| 2014/0269658 A1* | 9/2014 | Sadasivam | H04W 72/0406 | 370/338 |
| 2014/0342747 A1* | 11/2014 | Lee | H04L 5/0053 | 455/450 |
| 2015/0081840 A1* | 3/2015 | Patil | H04L 67/28 | 709/217 |
| 2015/0109961 A1* | 4/2015 | Patil | H04W 4/206 | 370/254 |
| 2015/0208325 A1* | 7/2015 | Ryu | H04W 48/14 | 455/3.05 |
| 2015/0215805 A1* | 7/2015 | Lee | H04W 36/0005 | 455/426.1 |
| 2015/0341447 A1* | 11/2015 | Patil | H04L 43/10 | 370/329 |
| 2015/0350866 A1* | 12/2015 | Patil | H04W 40/244 | 370/254 |
| 2015/0382159 A1* | 12/2015 | Kim | H04W 4/08 | 370/312 |
| 2016/0014669 A1* | 1/2016 | Patil | H04W 40/246 | 370/329 |
| 2016/0014715 A1* | 1/2016 | Patil | H04W 52/0216 | 370/329 |
| 2016/0057237 A1* | 2/2016 | Yang | H04L 67/16 | 709/224 |
| 2016/0073330 A1* | 3/2016 | Patil | H04L 61/2015 | 709/220 |
| 2016/0112986 A1* | 4/2016 | Patil | H04W 48/16 | 455/515 |
| 2016/0127996 A1* | 5/2016 | Patil | H04W 48/16 | 370/311 |
| 2016/0150466 A1* | 5/2016 | Jung | H04W 8/005 | 455/434 |
| 2016/0150537 A1* | 5/2016 | Jung | H04W 4/008 | 455/452.1 |
| 2016/0219588 A1* | 7/2016 | Buddhikot | H04M 15/68 | |
| 2016/0277914 A1* | 9/2016 | Kim | H04W 8/005 | |
| 2016/0345371 A1* | 11/2016 | Gattami | H04W 76/043 | |
| 2017/0034769 A1* | 2/2017 | Kim | H04W 48/08 | |

* cited by examiner

NEIGHBOR AWARE NETWORKING (NAN) DEVICE AND METHOD FOR SERVICE DISCOVERY

PRIORITY CLAIM

This application claims priority under 35 USC 119(e) to U.S. Provisional Patent Application Ser. No. 62/110,417 filed Jan. 30, 2015 [reference number P80071Z (884.S47PRV)], which is incorporated herein by reference in its entirety.

TECHNICAL FIELD

Embodiments pertain to wireless networks. Some embodiments relate to wireless local area networks (WLANs) and Wi-Fi networks including networks operating in accordance with the IEEE 802.11 family of standards, such as the IEEE 802.11 ac standard or the IEEE 802.11 ax SIG (named DensiFi). Some embodiments relate to Neighbor Aware Networking (NAN) communications. Some embodiments relate to services for NAN devices and establishment of such.

BACKGROUND

Wireless networks may support communication between mobile devices and a base station or access point as part of content delivery services or other applications. For instance, Wi-Fi or WLAN protocols may be employed in such networks. Some networks may also support communication between the mobile devices for various purposes. Accordingly, there is a general need for methods of supporting device-to-device communication in these and other networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
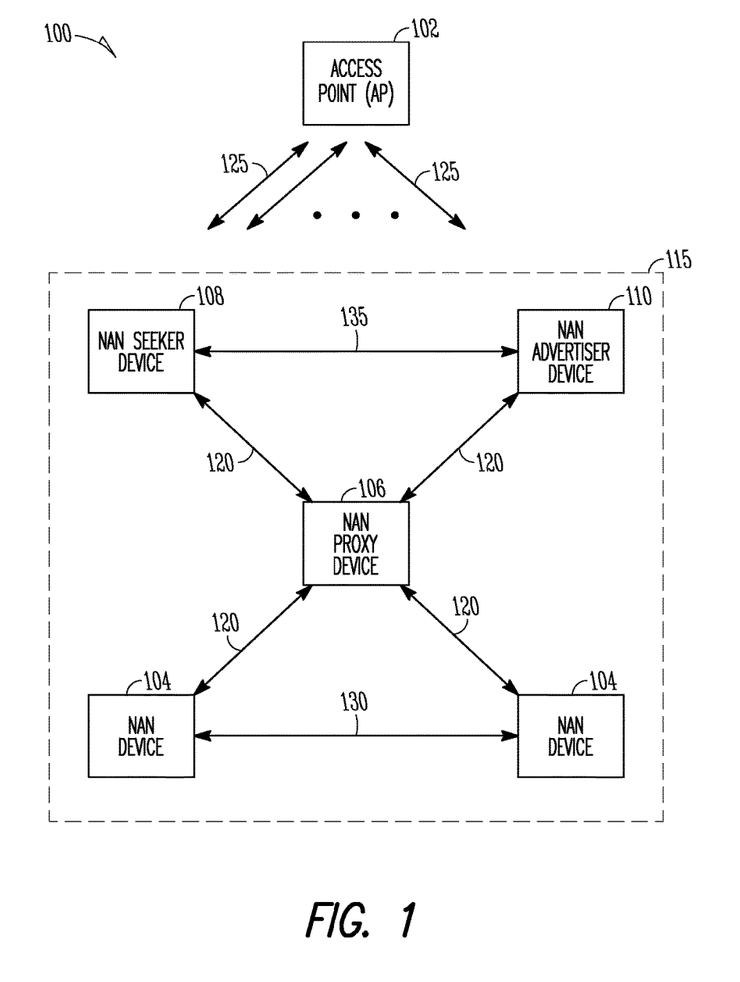
FIG. 1 illustrates an example of a Neighbor Aware Networking (NAN) network in accordance with some embodiments.

FIG. 1 illustrates an example of a Neighbor Aware Networking (NAN) network 100 in accordance with some embodiments. The NAN network 100 may include an access point (AP) 102 and may also include one or more NAN devices 104. The NAN devices 104 and the AP 102 may be configured to communicate with each other in accordance with one or more IEEE 802.11 standards or other standards. Such communication may be performed over wireless links such as 125, as shown in FIG. 1. In some embodiments, the NAN devices 104 may be user stations (STAs) configured to operate in accordance with IEEE 802.11 standards (including 5G Wi-Fi), but are not limited as such. The NAN devices 104 may also be configured to communicate directly with each other, in some cases, over wireless links such as 130. It should be noted that embodiments are not limited to the number of APs 102 or NAN devices 104 or other elements shown in FIG. 1. In addition, embodiments are also not limited to wireless links, as communication between devices (such as those shown in FIG. 1) may be performed over wired or wireless links or a combination thereof, in some embodiments.

As will be described below, the NAN devices 104 may also be configured to support various content delivery services or other services, and may exchange content, data or signals directly with other NAN devices 104 as part of those services. As an example, a content delivery service may enable a first NAN device 104 to receive content directly from a second NAN device 104. In this example, the first NAN device 104 that receives the content may be referred to as a "NAN seeker device" for the particular service while the second NAN device 104 that transmits the content may be referred to as a "NAN advertiser device" for the service. Such references may clarify illustrations of concepts herein, but are not limiting.

As an example, the NAN device 104 may be configured to support multiple services. The NAN device 104 may receive content as part of some of the services and may transmit content as part of some of the other services. In some cases, such services may be supported simultaneously such that the NAN device 104 may be considered a NAN seeker device for some of the services and a NAN advertiser device for other services. Referring back to FIG. 1, a NAN seeker device 108 and a NAN seeker device 110 are shown as part of the example NAN network 100 for illustrative purposes and may be referenced as such for clarity in some of the discussion herein. However, it is understood that, in some embodiments, the devices 104, 108, 110 may be able to support both reception and transmission of content in some cases. In some embodiments, the NAN seeker device 108 and/or the NAN advertiser device 110 may be an STA configured to operate in accordance with IEEE 802.11 standards (including 5G Wi-Fi), but is not limited as such.

The NAN network 100 may also include a NAN proxy device 106, which may perform various proxy or setup operations on behalf of the NAN devices 104, NAN seeker device 108 or NAN advertiser device 110. As an example, a content delivery service that enables content delivery between two NAN devices 104 may be established on behalf of the NAN devices 104 by the NAN proxy device 106. The NAN proxy device 106 may communicate with devices such as the NAN devices 104, NAN seeker device 108, and NAN advertiser device 110 over wireless links such as 120 for purposes such as the exchanging of setup messages or other messages. In some embodiments, the NAN proxy device 106 may be an STA configured to operate in accordance with IEEE 802.11 standards (including 5G Wi-Fi), but is not limited as such.

It should be noted that, in some cases, the NAN proxy device 106 may be referred to explicitly as a proxy device and may be configured for such proxy functionality, but embodiments are not so limited. In some embodiments, other devices such as 104, 108, and 110 may also be configured to perform proxy operations. For instance, one of the NAN devices 104 may perform such proxy operations in addition to other operations, such as seeking or providing content for one or more services.

In some embodiments, the NAN device 104 may transmit a service discovery frame (SDF) for a subscription to a service. The SDF may indicate a registration for the service with the NAN proxy device 106. The NAN device 104 may receive a service availability message from the NAN proxy device 106 during one or more reception periods, which may be based at least partly on timing information included in the SDF. The subscription may enable reception of content at the NAN device 104 from one or more other NAN devices 104 as part of the service. These embodiments will be described below.

The NAN devices 104, NAN proxy device 106, NAN seeker device 108, and the NAN advertiser device 110 may be included as part of a NAN cluster 115, although the scope of the embodiments is not limited in this respect. In some embodiments, the NAN cluster 115 may support one or more services for exchanging of content between the NAN devices 104, NAN seeker device 108, and NAN advertiser device 110. Communication between devices included in the NAN cluster 115 may be supported and performed according to synchronization and/or organization provided by an Anchor Master (AM) or other element included in the NAN cluster 115. The AM is not shown explicitly in FIG. 1, but one of the components shown in the NAN cluster 115, such as the NAN proxy device 106, may operate as an AM or may perform AM functionality. Embodiments are not so limited, however, and other elements not shown may also serve as an AM for the NAN cluster 115. In some embodiments, the role of AM may be served by the device that has the highest rank in an established hierarchy for the NAN cluster 115.

In some embodiments, the multiple-access technique used by the devices may include orthogonal frequency division multiple access (OFDMA) techniques, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used may be configured for uplink or downlink data communications. The AP 102 may communicate with NAN devices 104 (and other devices shown in the NAN cluster 115) in accordance with legacy IEEE 802.11 communication techniques in some embodiments.

It should be noted that embodiments may involve wireless communication according to one or more NAN wireless communication standards, such as standards developed by the Wi-Fi Alliance (WFA) NAN Task Group and/or the WFA NAN2 Task Group, including their predecessors, revisions, progeny, and/or variants. Various embodiments may additionally or alternatively involve wireless communications according to one or more other WFA standards, such as Wi-Fi, Wi-Fi Direct, Wi-Fi Direct Services, WiGig Display Extension (WDE), WiGig Bus Extension (WBE), and WiGig Serial Extension (WSE), including their predecessors, revisions, progeny, and/or variants. Some embodiments may additionally or alternatively include wireless communication according to one or more Institute of Electrical and Electronics Engineers (IEEE) wireless communications standards, such as IEEE 802.11, IEEE 802.11a, IEEE 802.11b, IEEE 802.11g, IEEE 802.11n, IEEE 802.11u, IEEE 802.11ac, IEEE 802.11ad, IEEE 802.11af, and IEEE 802.11ah, including their predecessors, revisions, progeny, and/or variants. The embodiments are not limited to these examples.

In addition, some embodiments may involve wireless communication performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants. Additional examples of broadband wireless communication technologies/standards that may be utilized in various embodiments may include Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants. The embodiments are not limited to these examples.

Figure 2:
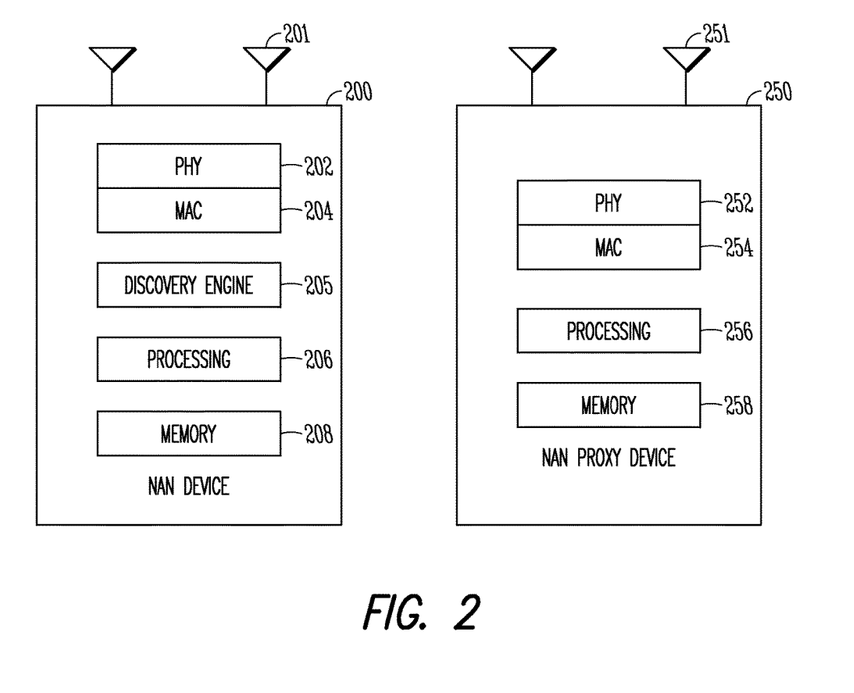
FIG. 2 illustrates a NAN device and a NAN proxy device in accordance with some embodiments.

FIG. 2 illustrates a NAN device and a NAN proxy device in accordance with some embodiments. The NAN device 200 may be suitable for use as a NAN device 104, NAN seeker device 108 or NAN advertiser device 110 as depicted in FIG. 1, while the NAN proxy device 250 may be suitable for use as a NAN proxy device 106 as depicted in FIG. 1. The NAN device 200 and NAN proxy device 250 may be Wi-Fi compliant devices that may be arranged to communicate with one or more other NAN devices 200, NAN proxy devices 250 or access points (APs). In accordance with embodiments, the NAN device 200 may include, among other things, physical layer (PHY) circuitry 202 and medium-access control layer circuitry (MAC) 204. In accordance with embodiments, the NAN proxy device 250 may include, among other things, physical layer (PHY) circuitry 252 and medium-access control layer circuitry (MAC) 254.

The PHY 202, PHY 252, MAC 204, and MAC 254 may be Wi-Fi compliant layers and may also be compliant with one or more legacy IEEE 802.11 standards or other IEEE 802.11 standards, including 5G Wi-Fi. The PHY 202 and PHY 252 may be arranged to transmit Wi-Fi frames. Accordingly, the PHY 202 may include transceiver circuitry that may perform operations including transmission and reception of frames, messages, signals, and/or data by the NAN device 200. In addition, the PHY 252 may include transceiver circuitry that may perform operations including transmission and reception of frames, messages, signals, and/or data by the NAN proxy device 250. The NAN device 200 may also include discovery engine circuitry 205 for performing tasks related to services that the NAN device 200 may intend to support, either for providing content or for receiving content or other purpose. As an example, the discovery engine circuitry 205 may determine that a service is to be sought based on user input, user selection on a menu of the NAN device 200 or other input to the NAN device 200. For instance, an application may enable reception of content from other devices located in close proximity to the NAN device 200 that may describe events, restaurants, special offers or other such information. The NAN device 200 may also include other processing circuitry 206 and memory 208 configured to perform the various operations described herein. The NAN device 250 may also include other processing circuitry 256 and memory 258 configured to perform the various operations described herein.

In accordance with some embodiments, the MAC 204 and/or MAC 254 may be arranged to contend for a wireless medium during a contention period to receive control of a medium for transmission and/or reception, and may also be arranged to configure frames for transmission. The PHY 202 and/or PHY 252 may be arranged to transmit the frames and to receive frames from other NAN devices 200, NAN proxy devices 250 or other devices. The MAC 204 may also be arranged to perform transmitting and receiving operations through the PHY 202, while the MAC 254 may also be arranged to perform transmitting and receiving operations through the PHY 252. The PHY 202 and/or PHY 252 may include circuitry for modulation/demodulation, upconversion and/or downconversion, filtering, amplification, etc. In some embodiments, the processing circuitry 206 and/or the processing circuitry 256 may include one or more processors.

In some embodiments, two or more antennas 201 may be coupled to the physical layer circuitry 202 and may be arranged for sending and receiving signals including transmission of the frames. The memory 208 may store information for configuring the processing circuitry 206 to perform operations for configuring and transmitting frames and performing the various operations described herein. In some embodiments, two or more antennas 251 may be coupled to the physical layer circuitry 252 and may be arranged for sending and receiving signals including transmission of the frames. The memory 258 may store information for configuring the processing circuitry 256 to perform operations for configuring and transmitting frames and performing the various operations described herein In some embodiments, the NAN device 200 and/or the NAN proxy device 250 may be configured to communicate using orthogonal frequency division multiplexing (OFDM) communication signals over a multicarrier communication channel. In some embodiments, the NAN device 200 and/or the NAN proxy device 250 may be configured to receive signals in accordance with specific communication standards, such as the Institute of Electrical and Electronics Engineers (IEEE) standards including IEEE 802.11-2012, 802.11n-2009, 802.11ac-2013 standards, 5G Wi-Fi standards and/or proposed specifications for WLANs including proposed HEW standards, although the scope of the invention is not limited in this respect as they may also be suitable to transmit and/or receive communications in accordance with other techniques and standards. In some other embodiments, the NAN device 200 and/or the NAN proxy device 250 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the NAN device 200 and/or the NAN proxy device 250 may be part of a portable wireless communication device, such as a personal digital assistant (PDA), a laptop or portable computer with wireless communication capability, a web tablet, a wireless telephone or smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the NAN device 200 and/or the NAN proxy device 250 may include one or more of a keyboard, a display, a non-volatile memory port, multiple antennas, a graphics processor, an application processor, speakers, and other mobile device elements. The display may be an LCD screen including a touch screen.

The antennas 201 of NAN device 200 and/or the antennas 251 of NAN proxy device 250 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201 and/or the antennas 251 may be effectively separated to take advantage of spatial diversity and the different channel characteristics that may result between each of antennas and the antennas of a transmitting station.

Although NAN device 200 and/or NAN device 250 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of HEW device 200 may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the NAN device 104 may transmit a service discovery frame (SDF) for a subscription to a service. The SDF may indicate a registration for the service with a detected NAN proxy device 106. The NAN device 104 may receive a service availability message from the NAN proxy device 106 during one or more reception periods, which may be based at least partly on timing information included in the SDF. The subscription may enable reception of content at the NAN device 104 from one or more other NAN devices 104 as part of the service. The NAN device 104 may further refrain from reception of messages during a sleep period exclusive to the reception periods. These embodiments will be described in more detail below.

Figure 3:
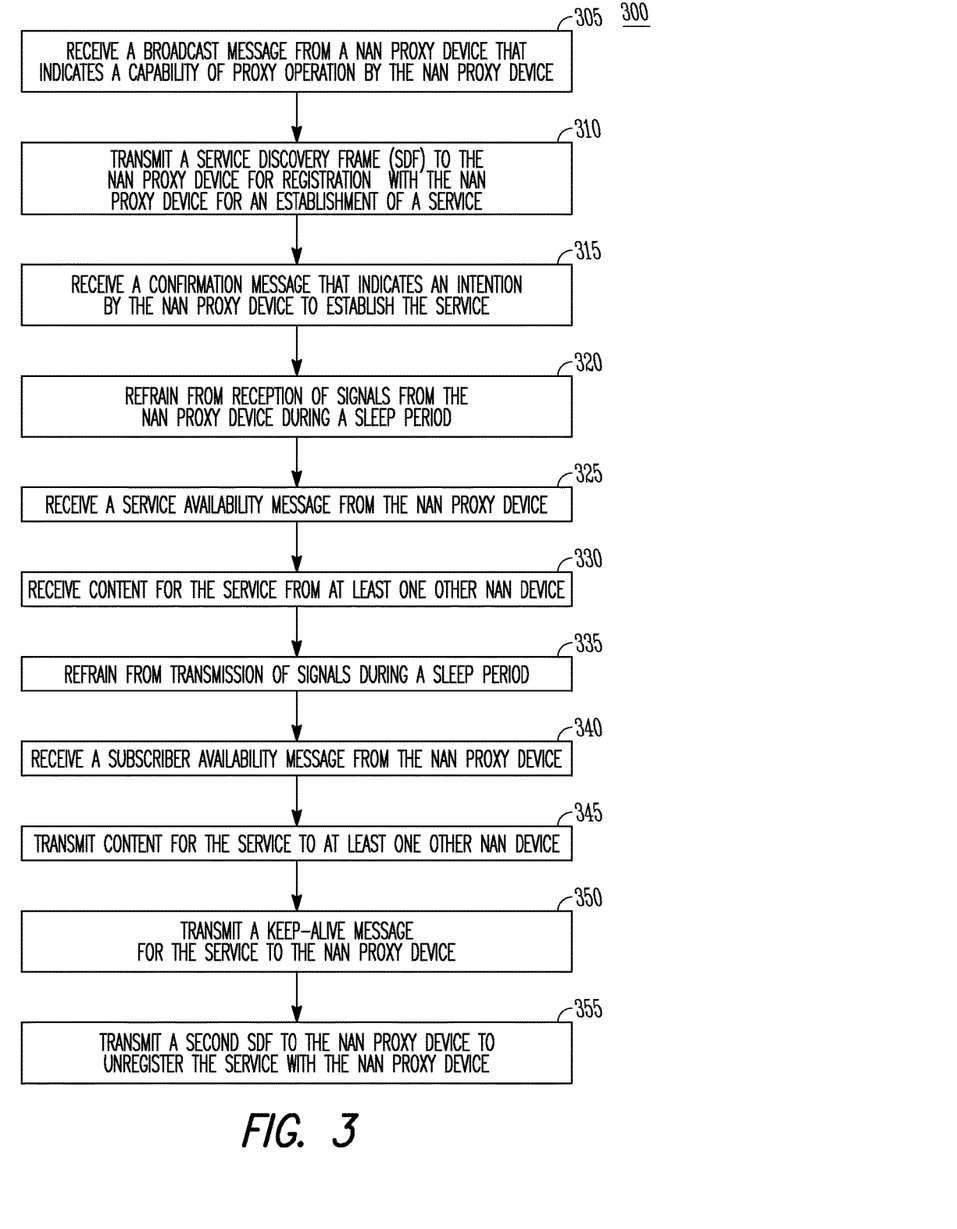
FIG. 3 illustrates the operation of a method of service discovery in accordance with some embodiments.

FIG. 3 illustrates the operation of a method of service discovery in accordance with some embodiments. It is important to note that embodiments of the method 300 may include additional or even fewer operations or processes in comparison to what is illustrated in FIG. 3. In addition, embodiments of the method 300 are not necessarily limited to the chronological order that is shown in FIG. 3. In describing the method 300, reference may be made to FIGS. 1-2 and 4-7, although it is understood that the method 300 may be practiced with any other suitable systems, interfaces and components.

In addition, while the method 300 and other methods described herein may refer to NAN devices 104, NAN proxy devices 106, NAN seeker devices 108, NAN advertiser devices 110 or other devices, embodiments of those methods are not limited to just those devices. Embodiments of the method 300 may also be practiced by other mobile devices, such as a user station (STA) and/or access point (AP), which may be configured to operate according to various 802.11 or other standards. Embodiments of the method 300 may also be practiced by an Evolved Node-B (eNB) or User Equipment (UE) configured to operate according to various Third Generation Partnership Project (3GPP) Long Term Evolution (LTE) standards or other standards. In addition, the method 300 and other methods described herein may also be practiced by wireless devices configured to operate in other suitable types of wireless communication systems.

At operation 305 of the method 300, a broadcast message may be received at the NAN device 104 from a NAN proxy device 106, and may indicate a capability of proxy operation by the NAN proxy device 106. Accordingly, the NAN device 104 may listen for or detect the NAN proxy device 106 by receiving such a broadcast message. In some embodiments, the broadcast message may be or may include a beacon message. In some embodiments, the proxy operation may include operation as a relay for exchanging setup messages for the NAN devices 104, as described previously. As an example, the NAN proxy device 106 may announce an availability of a service on behalf of a NAN device 104 that intends to provide the service. In some embodiments, the broadcast message may include information to identify services for which the NAN proxy device 106 may be capable of proxy operation. In such cases, the NAN device 104 may determine whether or not the NAN proxy device 106 is capable of acting as a proxy for the desired service by comparing it with the services indicated by the broadcast message.

In some embodiments, the broadcast message may enable NAN devices 104 to determine a system timing to which the NAN devices 104 and NAN proxy devices 106 may synchronize for exchanging of messages. As an example, the broadcast message may include information related to a frame timing, frame interval, master clock or other reference clock. As another example, a starting time (or other time) of the broadcast message may implicitly indicate the system timing. For instance, the broadcast message may be transmitted during a predetermined location within a frame, and detection of it by the NAN devices 104 may enable determination of the system timing. It should be noted that embodiments are not limited to the use of broadcast messages for the indication of proxy capability or timing or other related functionality. In some embodiments, one or more multicast or unicast messages may be used, in addition to or instead of, the broadcast messages.

In some embodiments, the system timing for synchronization of the NAN devices 104 and NAN proxy devices 106 may be indicated by a message transmitted by an Anchor Master (AM). Accordingly, the NAN device 104 may receive such a message and may utilize it to determine the appropriate system timing using techniques similar to or the same as those described for the broadcast message from the NAN proxy device 106. It should be pointed out that the AM may be the NAN proxy device 106, but embodiments are not limited as such. For instance, the AM may be another NAN device 104 or AP 102 in some cases.

At operation 310, a service discovery frame (SDF) may be transmitted by the NAN device 104 to the NAN proxy device 106. The SDF may be related to a service for which the NAN device 104 intends to register, either to provide content to or to receive content from one or more other NAN devices 104. As an example, when the NAN device 104 intends to receive content as part of the service, the SDF may indicate a registration to receive setup messages for the service from the NAN proxy device 106. In this case, the SDF may be for a subscription to the service, and the subscription may enable the reception of the content at the NAN device 104. As another example, when the NAN device 104 intends to provide content as part of the service, the SDF may indicate a registration to enable or instruct the NAN proxy device 106 to announce or advertise the service on behalf of the NAN device 104.

In some embodiments, the SDF may be transmitted according to the system timing indicated by the broadcast message. These embodiments are not limiting, however, as the SDF may also be transmitted according to another timing, such as a different system timing or reference timing. In addition, embodiments are not limited to transmission of a single SDF, as the NAN device 104 may transmit multiple SDFs as part of the indication to the NAN proxy device 106 of the intention to register the service. As an example, information for the establishment may be communicated in multiple SDFs. As another example, multiple SDFs that repeat some or all of the information may be transmitted by the NAN device 104 for diversity or other purposes.

Figure 4:
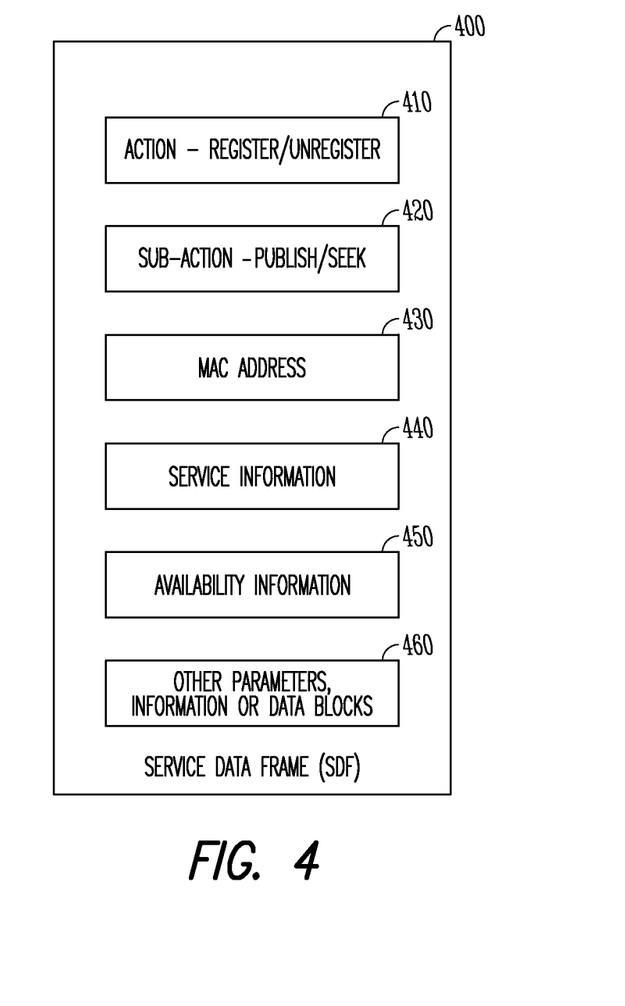
FIG. 4 illustrates an example of a Service Discovery Frame (SDF) in accordance with some embodiments.

FIG. 4 illustrates an example of a Service Discovery Frame (SDF) in accordance with some embodiments. The example SDF shown in FIG. 4 may be used to illustrate concepts described herein, but the scope of the embodiments is not limited by this example. In addition, formats and arrangements of the message and parameters as shown in FIG. 4 are also not limiting.

Referring to FIG. 4, the SDF 400 may include an action parameter 410, which may indicate whether the NAN device 104 intends to register or unregister a service. As an example, the action parameter 410 may take values such as "register" or "unregister." As another example, a number of bits may be included in the action parameter 410 to indicate a desired action from a predetermined set of possible actions. For instance, a single bit may be mapped to the desired actions of "register" and "unregister." These examples are not limiting, however, as other formats and actions may be used for the action parameter 410 in some cases.

The SDF 400 may also include a sub-action parameter 420, which may indicate whether the NAN device 104 intends to receive or provide content as part of the service. As an example, the sub-action parameter 420 may take values such as "publish" or "seek." The value of "publish" may indicate a request to the NAN proxy device 106 to advertise that the NAN device 104 is available and/or willing to provide content for the service. The value of "seek" may indicate to the NAN proxy device 106 that the NAN device 104 is interested in receiving content as part of the service. As another example, a number of bits may be included in the sub-action parameter 420 to indicate a desired sub-action from a predetermined set of possible sub-actions. For instance, a single bit may be mapped to the desired sub-actions of "publish" and "seek." These examples are not limiting, however, as other formats and sub-actions may be used for the sub-action 420 parameter in some cases.

The SDF 400 may also include a medium access control (MAC) address 430 for the NAN device 104, which may serve as an identifier of the NAN device 104. Embodiments are not limited to the use of a MAC address 430 for such identification purposes, however. In some embodiments, other addresses or identifiers may be included instead of, or in addition to, the MAC address 430.

The SDF 400 may also include service information 440, which may identify or describe the service. As a non-limiting example, a number of bits may be included in the service information 440 to identify the service from a predetermined set of services. For instance, the set of services may include services available to at least some of the NAN devices 104 and/or services that have been previously registered or used. These examples are not limiting, however, as other suitable techniques may be used to specify the service information 440.

The SDF 400 may also include availability information 450, which may include or may indicate one or more time periods during which the NAN device 104 may be available for exchanging (reception/transmission) of messages. As an example, the NAN device 104 may be available during such time periods for reception of setup messages for the service. As another example, the time periods may include a future time at which the NAN device 104 will have exited a sleep state and may once again be reachable. As another example, the availability information 450 may indicate one or more sleep periods during which the NAN device 104 may be unreachable or unavailable for exchanging of messages. In some embodiments, the availability information 450 may also include information specifying one or more frequency channels on which the NAN device 104 may be reachable at that future time. For instance, the NAN device 104 may intend to monitor the indicated channels during the reception time periods. In some embodiments, the availability information 450 may be excluded from the SDF 400 when the action 410 indicates a request to unregister the service. These examples are not limiting, however, as other suitable techniques may be used to specify the availability information 450.

The SDF 400 may also include any number (including zero) of other parameters, information or data blocks 460, which may or may not be related to service discovery or to techniques and operations described herein. For instance, control information for the SDF 400 may be included.

At operation 315, a confirmation message for the registration may be received at the NAN device 104. The confirmation message may confirm or indicate the reception of the SDF at the NAN proxy device 106, the registration of the service at the NAN proxy device 106 or an intention by the NAN proxy device 106 to establish the service for the NAN proxy device 104. In some embodiments, the confirmation message may include a registration identifier (RID) for the NAN device 104.

Figure 5:
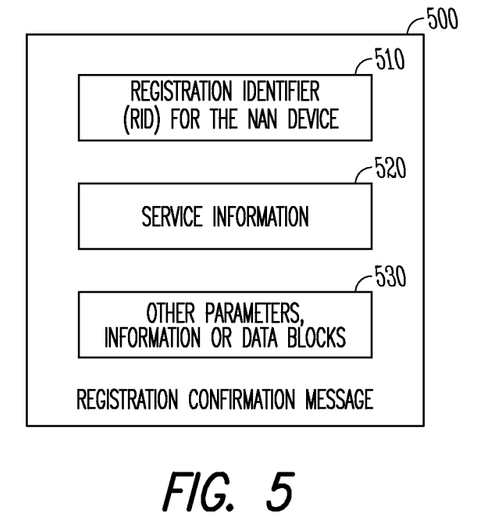
FIG. 5 illustrates an example of a registration confirmation message in accordance with some embodiments.

FIG. 5 illustrates an example of a registration confirmation message in accordance with some embodiments. The example registration confirmation message 500 shown in FIG. 5 may be used to illustrate concepts described herein, but the scope of the embodiments is not limited by this example. In addition, formats and arrangements of the message and parameters as shown in FIG. 5 are also not limiting. The registration confirmation message 500 may include a registration identifier (RID) 510 for the NAN device 104, which may be issued by the NAN proxy device 106 in any suitable manner. The RID may be used in other messages to identify the service and/or the NAN device 104. The registration confirmation message 500 may also include any number (including zero) of other parameters, information or data blocks 530, which may or may not be related to service discovery or to techniques and operations described herein. For instance, control information for the registration confirmation message 500 may be included.

At operation 320, the NAN device 104 may refrain from reception of signals from the NAN proxy device 106 during a sleep period. A service availability message may be received at the NAN device 104 from the NAN proxy device 106 at operation 325. At operation 330, content may be received directly from another NAN device 104 or from a NAN advertiser device 110 as part of the service. Although not limited as such, operations 320, 325, and 330 may be performed when the NAN device 104 seeks to receive content as part of the service, or when operating as a NAN seeker device 108.

The SDF may indicate or include one or more reception periods during which the NAN device 104 may be available for exchanging of messages with the NAN proxy device 106. The SDF may also indicate or include one or more sleep periods during which the NAN device 104 may be in a sleep mode or may be unavailable for exchanging of messages with the NAN proxy device 106. The reception periods and the sleep periods may be exclusive to each other in some cases.

The service availability message may be used to inform the NAN seeker device 108 that one or more other NAN devices 104 (or NAN advertiser devices 110) are available to provide content as part of the service. That is, the service availability message may be based on an indication to the NAN proxy device 106 by at least one of the other NAN devices 104 or NAN advertiser devices 110 of an intention, willingness or capability to provide content for the service.

Figure 6:
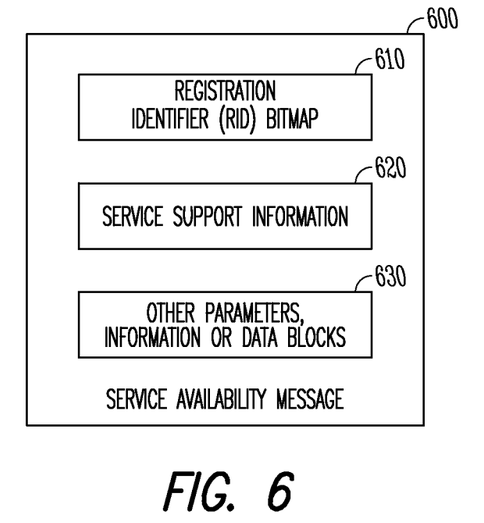
FIG. 6 illustrates an example of a service availability message in accordance with some embodiments.

FIG. 6 illustrates an example of a service availability message in accordance with some embodiments. The example service availability message 600 shown in FIG. 6 may be used to illustrate concepts described herein, but the scope of the embodiments is not limited by this example. In addition, formats and arrangements of the message and parameters as shown in FIG. 6 are also not limiting.

The service availability message 600 may indicate an availability (or unavailability) of the service. In some embodiments, a registration identifier (RID) bitmap 610 for the NAN device 104 may be included, and may indicate an availability (or unavailability) of the service. For instance, the availability may be based on a registration with the NAN proxy device 106 by another NAN device 104 to provide the service. As an example, one or more bit fields included in the RID bitmap 610 may be dedicated to specification of whether or not the service is available. As another example, RID bitmap 610 may be based on the previously described RID and/or information about the service.

Embodiments are not limited to the use of the RID bitmap 610, and various other service support information 620 may also be included in some embodiments. The service support information 620 may be included in addition to, or instead of, the RID bitmap 610. For instance, any number of messages, parameters, or indicators may be included in the service support information 620 to indicate the availability of the service.

In some embodiments, the RID bitmap 610 may indicate support for other services in addition to the service of interest for the NAN device 104 as referenced by the SDF 400. In some cases, some or all of the other services may have been requested by other NAN devices 104, in which case the NAN device 104 may utilize an appropriate portion of the RID bitmap 610 to determine the availability or unavailability of the service.

The service availability message 600 may also include any number (including zero) of other parameters, information or data blocks 630, which may or may not be related to service discovery or to techniques and operations described herein. For instance, control information for the service availability message 600 may be included.

In some embodiments, the service availability message may be received at the NAN device 104 during a time period that is based on timing information indicated by or included in the transmitted SDF. As an example, the NAN device 104 may use the SDF to indicate one or more reception periods in which the NAN device 104 is available for reception of setup messages from the NAN proxy device 106, and the sleep period may include time periods exclusive to those reception periods. In some cases, the reception periods may include one or more discovery windows (DWs), although not limited as such.

It should be noted that the "direct reception" of the content may refer to reception of the content through a communication path that bypasses or excludes the NAN proxy device 106. For instance, a direct wireless link between the NAN seeker device 108 and the NAN advertiser device 110, such as the link 135 (FIG. 1) may be used.

At operation 335, the NAN device 104 may refrain from transmission of signals from the NAN proxy device 106 during a sleep period. A subscriber availability message may be received at the NAN device 104 from the NAN proxy device 106 at operation 340. At operation 345, content may be transmitted directly to another NAN device 104 or to a NAN seeker device 108 as part of the service. Although not limited as such, operations 335, 340, and 345 may be performed when the NAN device 104 seeks to transmit or provide content as part of the service, or when operating as a NAN advertiser device 110. Accordingly, some embodiments of the method 300 may exclude some operations like 320, 325 or 330 when the NAN device 104 seeks to transmit content as part of the service. Similarly, some embodiments of the method 300 may exclude some operations like 335, 340 or 345 when the NAN device 104 seeks to receive content as part of the service.

It should also be noted that the NAN device 104 may refrain from both reception and transmission of signals during the sleep period, and may also refrain from other tasks. In addition, the NAN device 104 may enter a low-power mode or "battery saving" mode or similar during the sleep period in some cases.

The subscriber availability message may be used to inform the NAN advertiser device 110 that one or more other NAN devices 104 (or NAN seeker devices 108) wishes to receive content as part of the service. That is, the subscriber availability message may be based on an indication to the NAN proxy device 106 by at least one of the other NAN devices 104 or NAN seeker devices 108 of an intention, willingness or capability to receive content for the service.

The SDF transmitted at operation 310 may be used to indicate reception periods and/or sleep periods used for operations 335 and 340 through techniques such as those previously described. In addition, the "direct transmission" of the content may refer to transmission of the content through a communication path that bypasses or excludes the NAN proxy device 106. For instance, a direct wireless link between the NAN seeker device 108 and the NAN advertiser device 110 may be used.

At operation 350, the NAN device 104 may transmit a keep-alive message for the service to the NAN proxy device 106. The keep-alive message may enable the NAN device 104 to inform the NAN proxy device 106 that it is still interested in remaining registered for the service and may also enable the NAN proxy device 106 to keep the registration updated. The message may be related to a service for which the NAN device 104 receives or provides content. Accordingly, the keep-alive message may indicate an intention to further continue transmission or reception of content as part of the service.

In some embodiments, multiple keep-alive messages may be transmitted sequentially by the NAN device 104 while the NAN device 104 intends to remain registered for the service and to receive or transmit content as part of the service. As an example, the messages may be transmitted at periodic intervals or semi-regularly. The keep-alive message may include the RID of the NAN device 104 or other information related to the service and/or the NAN device 104 that may enable the NAN proxy device 106 to identify to which service the keep-alive message refers.

The NAN proxy device 106 may maintain a timer for reception of the keep-alive message, and may perform various actions in response to the timer exceeding a keep-alive timeout interval without reception of at least one keep-alive message. Such actions may include unregistering the service, unregistering the NAN device 104, and refraining from proxy operations for the service (such as announcing it). In some embodiments, the keep-alive timeout interval may be included in one or more messages transmitted by the NAN proxy device 106. For instance, the broadcast message that indicates proxy capability of the NAN proxy device 106 may include the keep-alive timeout interval. This example is not limiting, however, as other messages may also include the keep-alive timeout interval. In addition, other suitable techniques may be used. As an example, the value may be part of a standard.

At operation 355, a second SDF may be transmitted to the NAN proxy device 106 to unregister the service with the NAN proxy device 106. That is, when the NAN device 104 no longer wishes to receive or provide content as part of the service, the NAN device 104 may inform the NAN proxy device 106 to refrain from advertising the service or attempting to establish or maintain the service.

Figure 7:
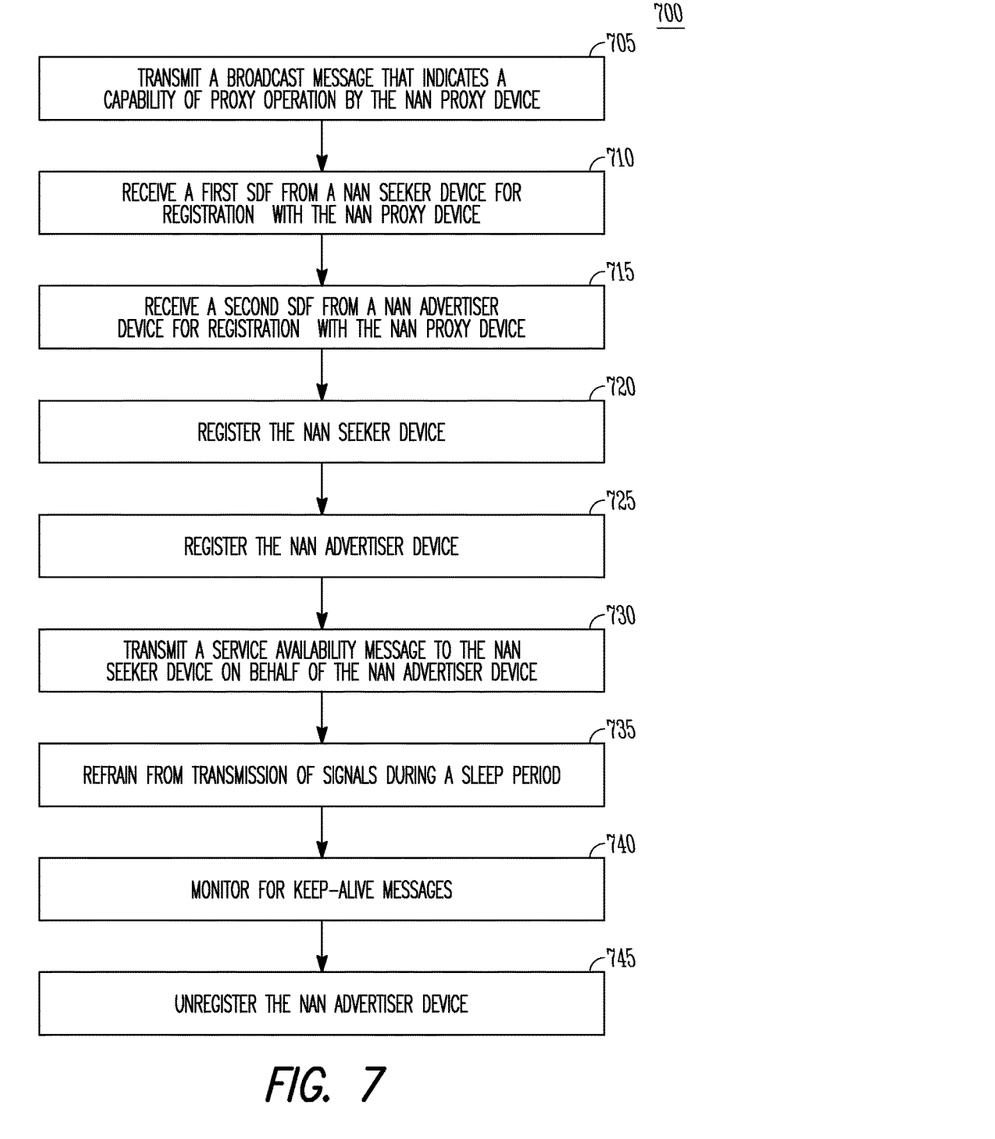
FIG. 7 illustrates the operation of another method of service discovery in accordance with some embodiments.

FIG. 7 illustrates the operation of another method of service discovery in accordance with some embodiments. As mentioned previously regarding the method 300, embodiments of the method 700 may include additional or even fewer operations or processes in comparison to what is illustrated in FIG. 7 and embodiments of the method 700 are not necessarily limited to the chronological order that is shown in FIG. 7. In describing the method 700, reference may be made to FIGS. 1-6, although it is understood that the method 700 may be practiced with any other suitable systems, interfaces and components. In addition, embodiments of the method 700 may refer to NAN devices 104, NAN proxy devices 106, eNBs, UEs, APs, STAs or other wireless or mobile devices.

It should be noted that the method 700 may be practiced at a NAN proxy device 106, and may include exchanging of signals or messages with a NAN device 104. Similarly, the method 300 may be practiced at the NAN device 104, and may include exchanging of signals or messages with the NAN proxy device 106. In some cases, operations and techniques described as part of the method 300 may be relevant to the method 700. For instance, an operation of the method 300 may include transmission of a frame by the NAN device 104 while an operation of the method 700 may include reception of the same frame or similar frame by the NAN proxy device 106. In addition, previous discussion of various concepts may be applicable to the method 700 in some cases, including services, registration, sleep periods, reception periods, proxy operation, NAN cluster, keep-alive messages, and others. In addition, the message formats shown in FIGS. 4-6 may also be used, in some cases.

At operation 705, the NAN proxy device 106 may transmit a broadcast message that indicates a capability, willingness or intention of the NAN proxy device 106 to operate as a relay for exchanging setup messages for one or more services on behalf of NAN devices 104. In some embodiments, the services may be supported or previously used or registered by one or more NAN devices 104 operating in a NAN cluster 115 that also included the NAN proxy device 106.

At operation 710, the NAN proxy device 106 may receive a first SDF from a NAN seeker device 108 that indicates an intention to receive content as part of a first service. The first SDF may further indicate one or more reception time periods (such as a DW) for the NAN seeker device 108 in which it will be available or will have exited a sleep mode. At operation 715, the NAN proxy device 106 may receive a second SDF from a NAN advertiser device 110 that indicates an intention to transmit content as part of a second service. The second SDF may also include timing information that indicates one or more sleep periods, reception periods or transmission periods for the NAN advertiser device 110, which may be related to exchanging of messages for the second service.

At operation 720, the NAN proxy device 106 may register the NAN seeker device 108 for the first service. The NAN proxy device 106 may register the NAN advertiser device 110 for the second service at operation 725. In some embodiments, registration of a NAN device 104 (or other device) may include storing or maintaining information related to the NAN device 104. The information may include one or more services for which the NAN device 104 requests proxy operation by the NAN proxy device 106. Accordingly, the NAN proxy device 106 may perform the proxy operations on behalf of registered NAN devices 104. As an example, the proxy operations may include advertising or seeking services on behalf of the NAN device 104.

At operation 730, a service availability message may be transmitted on behalf of the NAN advertiser device 110 during at least one of the reception time periods for the NAN seeker device 108. As an example, the transmission may be performed when a match between the first and second services is detected such that the NAN advertiser device 110 may provide content to the NAN seeker device 108 as part of the first service. The service advertisement may therefore inform the NAN seeker device 108 of the availability of the first service.

This example is not limiting, however, as the service availability message may also inform the NAN seeker device 108 that the service is not available or that a different NAN device 104 is available to provide content for the service. As an example, when the first and second service do not match, an unavailability condition may be indicated in the service availability message. As another example, when none of the NAN devices 104 included in the NAN cluster are currently registered to support the service, the unavailability condition may be indicated in the service availability message. As another example, when other NAN devices 104 in addition to or instead of the NAN advertiser device 110 are available to provide content for the service, an availability condition may be indicated in the service availability message. In addition, it should also be noted that the operations in the method 700 are not limited to the chronological order presented in FIG. 7. Accordingly, the NAN proxy device may receive the request to receive content from the NAN seeker device 108 before, after or at the same time as the indication to transmit content by the NAN advertiser device 110.

The service availability message 600 may be used as part of operation 730, although embodiments are not limited as such. In addition, the reception time periods during which the service availability message is transmitted may include a DW or other time period indicated by the NAN seeker device 108 in the first SDF or other SDF.

At operation 735, the NAN proxy device 106 may refrain from transmission of service availability messages or other messages during one or more time periods, which may be based on information received during the first SDF, second SDF, or other SDFs. As an example, the NAN proxy device 106 may refrain from transmitting information about services for which the NAN seeker device 108 has registered or requested during time periods in which the NAN seeker device 108 may be in a sleep mode. In some cases, the NAN proxy device 106 may still transmit service availability messages for reception at other NAN devices 104 during those time periods.

At operation 740, the NAN proxy device 106 may monitor for keep-alive messages. The messages may be received from any or all of the NAN seeker device 108, NAN advertiser device 110 or other NAN devices 104. The messages may be related to services for which those devices have registered with the NAN proxy device 106 and may include a related RID. Such messages may indicate an intention to further continue reception or transmission of content as part of one or more services, a request that the NAN proxy device 106 continue to seek or advertise the services, or a request to remain registered with the NAN proxy device 106 for the services. At operation 745, the NAN proxy device 106 may unregister the NAN advertiser device 110 (or one or more services registered for the NAN advertiser device 110) when the NAN proxy device 106 does not receive at least one keep-alive message during a keep-alive timeout period as described earlier. In addition, the NAN proxy device 106 may refrain from transmission of messages for the service in this case, such as service availability messages. The keep-alive message may be related to a service or the NAN advertiser device 110 or both.

An example of a Neighbor Aware Networking (NAN) device is disclosed herein. The NAN device may comprise transceiver circuitry and hardware processing circuitry. The hardware processing circuitry may configure the transceiver circuitry to transmit a service discovery frame (SDF) for a subscription to a service. The SDF may indicate a registration to receive setup messages for the service from a detected NAN proxy device. The hardware processing circuitry may further configure the transceiver circuitry to receive a service availability message from the NAN proxy device during a discovery window (DW). The DW may be based at least partly on timing information included in the SDF. The subscription may enable reception of content at the NAN device from one or more other NAN devices as part of the service.

In some examples, the NAN devices and the NAN proxy device may operate as part of a NAN cluster that supports one or more services for exchanging of content between the NAN devices. In some examples, the detection of the NAN proxy device may include reception of a broadcast message from the NAN proxy device that indicates a capability of the NAN proxy device to operate as a relay for exchanging setup messages for the services with the NAN devices. In some examples, the SDF may be transmitted according to a system timing indicated by the broadcast message. In some examples, the service availability message may be based on an indication to the NAN proxy device by at least one of the other NAN devices of an intention to operate as a content provider for the service.

In some examples, the timing information included in the SDF may indicate one or more reception periods in which the NAN device is available for reception of the setup messages from the NAN proxy device. In some examples, the hardware processing circuitry may further configure the transceiver circuitry to refrain from reception of signals during a sleep period exclusive to the reception periods. In some examples, the hardware processing circuitry may further configure the transceiver circuitry to receive the content directly from at least one of the other NAN devices as part of the service. In some examples, the hardware processing circuitry may further configure the transceiver circuitry to receive, from the NAN proxy device, a confirmation message for the registration that includes a registration identifier (RID) for the NAN device. In some examples, the service availability message may include a registration identifier (RID) bitmap that indicates an availability of the service and an availability of at least one other service.

In some examples, the hardware processing circuitry may include discovery engine circuitry configured to determine an intention to subscribe to the service. The hardware processing circuitry may further include medium access control (MAC) circuitry configured to assemble the SDF based on the intention to subscribe to the service. In some examples, the NAN device may be configured to operate according to a Wireless Local Area Network (WLAN) protocol. In some examples, the NAN device may further comprise one or more antennas coupled to the transceiver circuitry for the transmission of the SDF and for the reception of the service availability message.

An example of a non-transitory computer-readable storage medium that stores instructions for execution by one or more processors of a Neighbor Aware Networking (NAN) device to perform operations for communication is also disclosed herein. The operations may configure the one or more processors to transmit a service discovery frame (SDF) to a NAN proxy device for an establishment of a service on behalf of the NAN device. The service may enable exchanging of content between the NAN device and one or more other NAN devices. The operations may further configure the one or more processors to receive a confirmation message that indicates an intention by the NAN proxy device to establish the service. The operations may further configure the one or more processors to refrain from exchanging of signals with the NAN proxy device during a sleep period indicated in the SDF. The operations may further configure the one or more processors to receive one or more setup messages for the service during a reception period exclusive to the sleep period. The SDF may indicate a registration of the NAN device and the service with the NAN proxy device.

In some examples, the SDF may indicate an intention of the NAN device to subscribe to the service for reception of content from the other NAN devices. In some examples, the received setup messages may include a service availability message that is based on an indication to the NAN proxy device by at least one of the other NAN devices of an intention to operate as a content provider for the service. In some examples, the operations may further configure the one or more processors to receive the content from the other NAN devices. In some examples, the SDF may indicate an intention of the NAN device to transmit content to the other NAN devices as part of the service. In some examples, the operations may further configure the one or more processors to transmit the content to the other NAN devices. In some examples, the operations may further configure the one or more processors to receive a broadcast message from the NAN proxy device that indicates a system timing. The SDF may be transmitted according to the system timing.

An example of a method of Neighbor Aware Networking (NAN) communication performed by a NAN device is also disclosed herein. The method may comprise transmitting a service discovery frame (SDF) for a subscription to a service. The SDF may indicate a registration to receive setup messages for the service from a detected NAN proxy device. The method may further comprise receiving a service availability message from the NAN proxy device during a discovery window (DW). The DW may be based at least partly on timing information included in the SDF. The subscription may enable reception of content at the NAN device from one or more other NAN devices as part of the service. In some examples, the NAN devices and the NAN proxy device may operate as part of a NAN cluster configured to support one or more services for exchanging of content between the NAN devices.

An example of a Neighbor Aware Networking (NAN) proxy device is also disclosed herein. The NAN proxy device may comprise hardware processing circuitry and transceiver processing circuitry. The hardware processing circuitry may configure the transceiver circuitry to receive a first service discovery frame (SDF) from a NAN seeker device that indicates an intention to receive content as part of a first service and further indicates one or more reception time periods for the NAN seeker device. The hardware processing circuitry may further configure the transceiver circuitry to receive a second SDF from a NAN advertiser device that indicates an intention to transmit content as part of a second service. The hardware processing circuitry may further configure the transceiver circuitry to transmit a service availability message to the NAN seeker device on behalf of the NAN advertiser device during at least one of the reception time periods for the NAN seeker device. When a match between the first service and second service is detected, the service availability message may indicate an availability condition for the first service to the NAN seeker device.

In some examples, the service availability message may indicate an unavailability condition for the first service when a match between the first service and the second service is not detected. In some examples, the NAN proxy device may operate as part of a NAN cluster that supports services that deliver content between a group of NAN devices that includes the NAN seeker device and the NAN advertiser device. In some examples, the hardware processing circuitry may further configure the transceiver circuitry to transmit a broadcast message that indicates a capability of the NAN proxy device to operate as a relay for exchanging setup messages for the supported services on behalf of the NAN devices.

In some examples, the hardware processing circuitry may further configure the transceiver circuitry to receive keep-alive messages from the NAN advertiser device according to a keep-alive timeout period. The keep-alive messages may indicate an intention to further continue transmission of content as part of the second service. In some examples, the hardware processing circuitry may be further configured to unregister the second service when the keep-alive messages are not received during a time duration greater than the keep-alive timeout period. In some examples, the NAN proxy device may be configured to operate according to a Wireless Local Area Network (WLAN) protocol. In some examples, the NAN proxy device may further comprise one or more antennas coupled to the transceiver circuitry for the reception of the SDFs and the transmission of the service availability message.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A Neighbor Aware Networking (NAN) device comprising transceiver circuitry and hardware processing circuitry to configure the transceiver circuitry to:
    transmit a service discovery frame (SDF) for a subscription to a service, the SDF indicating a registration to receive setup messages for the service from a detected NAN proxy device, the SDF further including timing information indicating one or more reception periods in which the NAN device is available for reception of the setup messages from the NAN proxy device, the registration configured to cause the NAN proxy device to forward setup messages received by the NAN proxy device for the service to the NAN device during the indicated one or more reception periods;
    receive a confirmation message for the SDF, the confirmation message indicating the NAN proxy device has established the service, the confirmation message further indicating the NAN proxy device is configured to forward setup messages received by the NAN proxy for the service to the NAN device during the indicated one or more reception periods; and
    receive a service availability setup message from the NAN proxy device during a discovery window (DW), wherein the DW is based at least partly on the timing information included in the SDF,
    wherein the subscription enables reception of content at the NAN device from one or more other NAN devices as part of the service.

2. The NAN device according to claim 1, wherein the NAN devices and the NAN proxy device operate as part of a NAN cluster that supports one or more services for exchanging of content between the NAN devices.

3. The NAN device according to claim 2, wherein the detection of the NAN proxy device includes reception of a broadcast message from the NAN proxy device that indicates a capability of the NAN proxy device to operate as a relay for exchanging setup messages for the one or more services with the NAN devices.

4. The NAN device according to claim 3, wherein the SDF is transmitted according to a system timing indicated by the broadcast message.

5. The NAN device according to claim 1, wherein the service availability setup message is based on an indication to the NAN proxy device by at least one of the other NAN devices of an intention to operate as a content provider for the service.

6. The NAN device according to claim 1, the hardware processing circuitry further to configure the transceiver circuitry to refrain from reception of signals during a sleep period, wherein the sleep period does not overlap with the one or more reception periods.

7. The NAN device according to claim 1, the hardware processing circuitry further to configure the transceiver circuitry to receive the content directly from at least one of the other NAN devices as part of the service.

8. The NAN device according to claim 1, wherein the confirmation message for the registration includes a registration identifier (RID) for the NAN device.

9. The Neighbor Aware Networking (NAN) device of claim 8, wherein the hardware processing circuitry further configures the transceiver circuitry to: transmit a keep-alive message to the NAN proxy device to remain registered for the service, the keep-alive message including the registration identifier, the keep-alive message configured to cause the NAN proxy device to refrain from unregistering the service and unregistering the NAN device during a keep-alive timeout interval.

10. The NAN device according to claim 1, wherein the service availability setup message includes a registration identifier (RID) bitmap that indicates an availability of the service and an availability of at least one other service.

11. The NAN device according to claim 1, wherein the hardware processing circuitry includes: discovery engine circuitry configured to determine an intention to subscribe to the service, and medium access control (MAC) circuitry configured to assemble the SDF based on the intention to subscribe to the service.

12. The NAN device according to claim 1, wherein the NAN device is configured to operate according to a Wireless Local Area Network (WLAN) protocol.

13. The NAN device according to claim 1, the NAN device further comprising one or more antennas coupled to the transceiver circuitry for the transmission of the SDF and for the reception of the service availability setup message.

14. The Neighbor Aware Networking (NAN) device of claim 1,
    wherein the registration is further configured to cause the NAN proxy device to store information related to the NAN device, the information indicating one or more services for which the NAN device requests proxy operation by the NAN proxy device, wherein the forwarding of setup messages received by the NAN proxy device for the service to the NAN device during the indicated one or more reception periods is based on the stored information and the registration.

15. A non-transitory computer-readable storage medium that stores instructions for execution by one or more processors of a Neighbor Aware Networking (NAN) device to perform operations for communication, the operations to configure the one or more processors to:
    transmit a service discovery frame (SDF) to a NAN proxy device for an establishment of a service on behalf of the NAN device, wherein the service enables exchanging of content between the NAN device and one or more other NAN devices, the SDF indicating a registration of the NAN device and the service with the NAN proxy device and further indicating one or more reception periods in which the NAN device is available for reception of setup messages from the NAN proxy device, the registration configured to cause the NAN proxy device to forward setup messages received by the NAN proxy device for the service to the NAN device during the indicated one or more reception periods;

receive a confirmation message that indicates an intention by the NAN proxy device to establish the service, the confirmation message further indicating the NAN proxy device is configured to forward setup messages received by the NAN proxy for the service to the NAN device during the indicated one or more reception periods;

refrain from exchanging of signals with the NAN proxy device during a sleep period, wherein the sleep period does not overlap with the reception periods indicated in the SDF; and receive one or more setup messages for the service during a reception period indicated in the SDF.

16. The non-transitory computer-readable storage medium according to claim 15,
wherein the SDF indicates an intention of the NAN device to subscribe to the service for reception of content from the other NAN devices.

17. The non-transitory computer-readable storage medium according to claim 16, wherein the received setup messages include a service availability setup message that is based on an indication to the NAN proxy device by at least one of the other NAN devices of an intention to operate as a content provider for the service.

18. The non-transitory computer-readable storage medium according to claim 16, the operations to further configure the one or more processors to receive the content from the other NAN devices.

19. The non-transitory computer-readable storage medium according to claim 15, wherein the SDF indicates an intention of the NAN device to transmit content to the other NAN devices as part of the service.

20. The non-transitory computer-readable storage medium according to claim 19, the operations to further configure the one or more processors to transmit the content to the other NAN devices.

21. The non-transitory computer-readable storage medium according to claim 15, wherein: the operations further configure the one or more processors to receive a broadcast message from the NAN proxy device that indicates a system timing and the SDF is transmitted according to the system timing.

22. A method of Neighbor Aware Networking (NAN) communication performed by a NAN device, the method comprising:
transmitting a service discovery frame (SDF) for a subscription to a service, the SDF indicating a registration to receive setup messages for the service from a detected NAN proxy device, the SDF further including timing information indicating one or more reception periods in which the NAN device is available for reception of the setup messages from the NAN proxy device, the registration configured to cause the NAN proxy device to forward setup messages received by the NAN proxy device for the service to the NAN device during the indicated one or more reception periods;

receive a confirmation message for the SDF, the confirmation message indicating the NAN proxy device has established the service, the confirmation message further indicating the NAN proxy device is configured to forward setup messages received by the NAN proxy for the service to the NAN device during the indicated one or more reception periods; and receiving a service availability setup message from the NAN proxy device during a discovery window (DW), wherein the DW is based at least partly on the timing information included in the SDF, wherein the subscription enables reception of content at the NAN device from one or more other NAN devices as part of the service.

23. The method according to claim 22,
wherein the NAN devices and the NAN proxy device operate as p art of a NAN cluster configured to support one or more services for exchanging of content between the NAN devices.

\* \* \* \* \*

UNITED STATES PATENT AND TRADEMARK OFFICE
CERTIFICATE OF CORRECTION

PATENT NO. : 10,200,826 B2
APPLICATION NO. : 14/727546
DATED : February 5, 2019
INVENTOR(S) : Park et al.

Page 1 of 1

It is certified that error appears in the above-identified patent and that said Letters Patent is hereby corrected as shown below:

In the Claims

In Column 20, Line 39, in Claim 23, delete "p art" and insert --part-- therefor

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*